(12) United States Patent
Zhao

(10) Patent No.: US 11,438,511 B2
(45) Date of Patent: Sep. 6, 2022

(54) METHOD FOR CONTROLLING ELECTRONIC DEVICE AND ELECTRONIC DEVICE THEREOF

(71) Applicant: LENOVO (BEIJING) LIMITED, Beijing (CN)

(72) Inventor: Yongbao Zhao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 153 days.

(21) Appl. No.: 16/506,383

(22) Filed: Jul. 9, 2019

(65) Prior Publication Data

US 2019/0335107 A1    Oct. 31, 2019

Related U.S. Application Data

(63) Continuation of application No. PCT/CN2017/102940, filed on Sep. 22, 2017.

(30) Foreign Application Priority Data

Jan. 16, 2017 (CN) .......................... 201710030698.5

(51) Int. Cl.
*H04N 5/232* (2006.01)
*G03B 13/02* (2021.01)
*G06T 19/00* (2011.01)

(52) U.S. Cl.
CPC ......... *H04N 5/23293* (2013.01); *G03B 13/02* (2013.01); *G06T 19/006* (2013.01)

(58) Field of Classification Search
CPC ............... H04N 5/23293; H04N 5/232; H04N 5/23245; H04N 5/222; H04N 5/23238; G03B 13/02; G06T 19/006; G06F 3/011
See application file for complete search history.

(56) References Cited

U.S. PATENT DOCUMENTS

2014/0096084 A1* 4/2014 Kwon ..................... G06F 3/017
715/835
2014/0118401 A1* 5/2014 Yamane .............. G06F 3/04883
345/636
(Continued)

FOREIGN PATENT DOCUMENTS

CN      103607539 A     2/2014
CN      104967772 A    10/2015
(Continued)

OTHER PUBLICATIONS

The World Intellectual Property Organization (WIPO) International Search Report for PCT/CN2017/102940 dated Nov. 30, 2017 6 Pages (including translation).

*Primary Examiner* — Nhan T Tran
*Assistant Examiner* — Tuan H Le
(74) *Attorney, Agent, or Firm* — Anova Law Group, PLLC

(57) ABSTRACT

Embodiments of the present disclosure provide a method for controlling an electronic device. The method includes the steps of displaying a viewfinder interface, the viewfinder interface including a first image, the first image including a target image; acquiring first operation information for a target operation of the target image in the first image; determining whether the first operation information satisfies a rule; and determining whether to trigger the electronic device to enter a first image collection mode based on a determination result, wherein in the first image collection mode, the target image in the first image is combined with multimedia information to display a combined multimedia information with the target image in the viewfinder interface.

11 Claims, 3 Drawing Sheets

(56) References Cited

U.S. PATENT DOCUMENTS

| 2017/0010727 | A1* | 1/2017 | Jeon | G06F 3/016 |
| 2018/0054611 | A1* | 2/2018 | Shin | G06F 1/1694 |
| 2019/0098213 | A1* | 3/2019 | Kim | G06F 3/0488 |

FOREIGN PATENT DOCUMENTS

| CN | 105100611 A | 11/2015 |
| CN | 105224227 A | 1/2016 |
| CN | 105393522 A | 3/2016 |
| CN | 105979154 A | 9/2016 |
| CN | 106060390 A | 10/2016 |
| CN | 106126066 A | 11/2016 |
| CN | 106203286 A | 12/2016 |
| CN | 106231195 A | 12/2016 |
| CN | 106851052 A | 6/2017 |
| JP | 2012118967 A | 6/2012 |
| JP | 2004088230 A | 3/2014 |

\* cited by examiner

METHOD FOR CONTROLLING ELECTRONIC DEVICE AND ELECTRONIC DEVICE THEREOF

CROSS-REFERENCES TO RELATED APPLICATION

This application claims priority to PCT Application No. PCT/CN2017/102940, filed on Sep. 22, 2017, which in turn claims priority to Chinese Patent Application No. 201710030698.5, entitled "Method for Controlling Electronic Device and Electronic Device Thereof," filed on Jan. 16, 2017. The entire content of the two applications are incorporated herein by reference.

FIELD OF TECHNOLOGY

The present disclosure relates to the field of control technology, and more specifically, to a method for controlling an electronic device and an electronic device thereof.

BACKGROUND

Augmented Reality (AR) technology is a hot topic in current imaging applications. The camera of an electronic device may be combined with the AR technology to provide users with richer information, such as detecting information of roads, buildings, or goods to provide reference information; or to add attractive effects while capturing an image, such as adding an interesting object to embellish the image. However, although a conventional electronic device may include an AR mode, if a user needs to achieve the AR effect, it is often necessary to switch to the AR mode before capturing an image. The process of the user operation mentioned above may be cumbersome and the operation itself may be complicated. Further, sometimes when the user needs to take a snapshot, the AR mode cannot be entered quickly, which may impair the user experience.

BRIEF SUMMARY OF THE DISCLOSURE

A first aspect of the present disclosure provides a method for controlling an electronic device. The method includes the steps of displaying a viewfinder interface, the viewfinder interface including a first image, the first image including a target image; acquiring first operation information for a target operation of the target image in the first image; determining whether the first operation information satisfies a rule; and determining whether to trigger the electronic device to enter a first image collection mode based on a determination result, wherein in the first image collection mode, the target image in the first image is combined with multimedia information to display a combined multimedia information with the target image in the viewfinder interface.

Another aspect of the present disclosure provides an electronic device. The electronic device includes a display unit for displaying a viewfinder interface, the viewfinder interface including a first image, the first image including a target image; a collection unit for acquiring first operation information for a target operation of the target image in the first image; a determination unit for determining whether the first operation information satisfies a rule; and a collection mode determination unit for determining whether to trigger the electronic device to enter a first image collection mode based on a determination result, wherein in the first image collection mode, the target image in the first image is combined with multimedia information to display a combined multimedia information with the target image in the viewfinder interface.

Another aspect of the present disclosure provides an electronic device. The device includes a camera for collecting images; and one or more processors to execute computer executable instructions to display a viewfinder interface, the viewfinder interface including a first image, the first image including a target image; acquire first operation information for a target operation of the target image in the first image; determine whether the first operation information satisfies a rule; and determine whether to trigger the electronic device to enter a first image collection mode based on a determination result, wherein in the first image collection mode, the target image in the first image is combined with multimedia information to display a combined multimedia information with the target image in the viewfinder interface.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Figure 1:
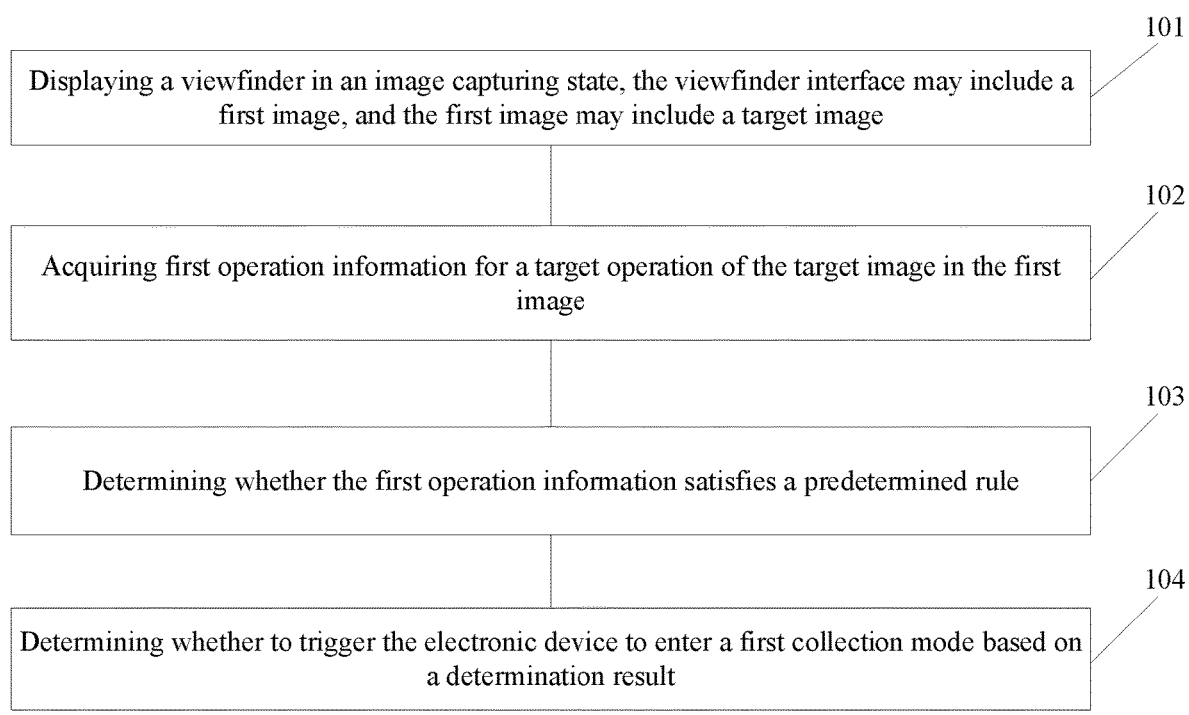
FIG. 1 is a flowchart of a control method of an electronic device according to an embodiment of the present disclosure.

Hereinafter, aspects, features, and embodiments of the present disclosure will be described with reference to the accompanying drawings. It should be understood that such description is illustrative only but is not intended to limit the scope of the present disclosure. In addition, in the following description, known structures and technologies are not described to avoid unnecessary obscuring of the present disclosure.

The terms used herein is for the purpose of describing particular embodiments only, but is not intended to limit the present disclosure. The terms such as "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present disclosure and should not be interpreted in an idealized or overly limiting manner.

A few block diagrams and flowcharts are shown in the accompanying drawings. It should be understood that some of the blocks or combinations thereof in the block diagrams and flowcharts may be implemented by computer executable instructions. The computer executable instructions may be provided to a general purpose computer, a dedicated computer, or processors of other programmable data processing apparatus, so that the instructions, when being executed by the processor, may create means for implementing the functions/operations as described in the block diagrams and flowcharts.

Thus, the techniques of the present disclosure may be implemented in forms of hardware and/or software (including firmware, microcode, etc.). In addition, the techniques of the present disclosure may be embodied in a form of computer program instructions stored in a computer readable medium. The computer program instructions may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

In order to improve the user experience related to not being able to enter the AR mode quickly while taking a snapshot, a process in which the electronic device may automatically detect a target and add on an AR effect has been introduced. Although this process may be easy to use, there may be a concern of undesirable AR effect by automatically adding the AR effect. For example, in the case where the user does not wish to use the AR effect, automatically adding the AR effect may affect the user's intended use of the electronic device. Therefore, the embodiments of the present disclosure provide a method for controlling an electronic device and an electronic device thereof. Further, the embodiments of the present disclosure are described in detail below with reference to the accompanying drawings. It should be understood that the accompanying drawings are for illustrative purposes only and are not intended to limit the scope of the present disclosure.

The embodiments of the present disclosure provide a control method of an electronic device and an electronic device thereof. The electronic device may acquire a target operation for a target image and determine whether to trigger the electronic device to enter a first image collection mode based on a relationship between a first operation information of the target operation and a rule, or a predetermined rule. In the first image collection mode, the electronic device may acquire multimedia information, which can be predetermined by the user, and combine the target image with the multimedia information. As such, the combined multimedia information including the target image may be displayed in a viewfinder interface to realize the AR effect. Therefore, the embodiments of the present disclosure may achieve the objective of quickly entering the AR mode based on a user operation during the regular image capturing process. In addition, the method of quickly entering the AR mode may be automatically performed by the electronic device based on a user operation without additional user intervention. Therefore, compared with complicated manual method of entering the AR mode, the control method of the present disclosure is simple and more user friendly, and may provide a foundation for further improving user experience. Further, the controllability of entering the AR mode may be enhanced compared with methods in which the electronic device may automatically detect a target and add on the AR effect.

The control method of the electronic device provided by the various embodiments of the present disclosure may be applied to a camera or the like; or a mobile phone, a tablet, or the like capable of supporting an image capturing function. Further, the method provided in the embodiments of the present disclosure is capable of quickly entering the AR mode based on a user operation during a regular image capturing process. In addition, the process of entering the AR mode may be performed automatically by the electronic device without intervention by the user. Therefore, compared with the complicated manual methods of entering the AR mode, the control method of the present disclosure is simple and more user friendly, and may provide a foundation for further improving user experience.

FIG. 1 is a flowchart of a control method of an electronic device according to an embodiment of the present disclosure.

More specifically, as shown in FIG. 1, a control method of an electronic device according to an embodiment of the present disclosure may include Steps 101 to 104.

Step 101, displaying a viewfinder interface in an image capturing mode, and the viewfinder interface may include a first image including a target image.

Step 102, acquiring first operation information for a target operation of the target image in the first image.

More specifically, for example, the target operation for the target image in the first image of the viewfinder interface may be detected by a sensor. When the target operation is detected, the first operation information of the target operation may be acquired.

To reduce the probability of an erroneous operation, the target operation may specifically be an operation for the target image. For example, an operation that meets certain conditions among various user operations may be determined as the target operation. That is, the various user operations may be screened by certain conditions, thereby reducing the probability of an erroneous operation.

More specifically, in one embodiment, a first operation of the electronic device may be acquired and location information corresponding to the first operation may be acquired. When the location information corresponding to the first operation is within a target area in which the target image may be located in the first image, the first operation may be determined as the target operation.

The first operation may be any operation of the user, such as any type of user operation in a task region of the viewfinder interface.

Further, in one embodiment, the first operation may be ignored when it is determined that the location information corresponding to the first operation is not in the target area in which the target image may be located in the first image. That is, the first operation may be blocked, thereby avoiding an erroneous operation.

Step 103, determining whether the first operation information satisfies a predetermined rule.

Step 104, determining whether to trigger the electronic device to enter a first image collection mode based on a determination result; in in the first image collection mode, at least the target image in the first image may be combined with predetermined multimedia information to display the combined multimedia information including the target image in the viewfinder interface.

In one embodiment, the electronic device may further include a second image collection mode.

More specifically, when the electronic device determines that the first operation information satisfies the predetermined rule, the electronic device may be triggered to enter the first image collection mode. In the first image collection mode, the electronic device may acquire predetermined multimedia information, such as AR information, and at least combine the target image in the first image with the predetermined multimedia information. As such, the combined multimedia information including the target image may be displayed in the viewfinder interface. That is, when the electronic device is in the first image collection mode, the electronic device may combine the AR information predetermined by itself with the currently acquired target image, and display the combined multimedia information including the target image to realize the AR effect. Of course, in one embodiment, the electronic device may combine other acquired contents other than the target image in the first image with the predetermined AR information based on an actual setting to realize the AR effect.

Further, when the electronic device determines that the first operation information does not satisfy the predetermined rule, the electronic device may be triggered to enter the second image collection mode. In the second image collection mode, the electronic device may only display the collected first image including the target image in the viewfinder interface, and may not combine it with the AR information, that is, a normal collection mode.

In one embodiment of the control method of the electronic device of the present disclosure, when the electronic device is in the first image collection mode, the method may further include: acquiring a second operation indicating a switch of the collection mode, and triggering the electronic device to switch from the first collection to the second image collection mode based on the second operation, where the first image may be included in the viewfinder interface in the second image collection mode.

The second operation indicating the switch of the collection mode may be, for example, detecting the second operation by using a detection device such as a sensor, and transmitting a signal of the second operation to a processor of the electronic device. Subsequently, the processor may trigger the electronic device to switch from the first image collection mode to the second image collection mode based on the second operation. In particular, in the second image collection mode, the electronic device may display the collected first image including the target image in the viewfinder interface.

That is, in one embodiment, when the electronic device is in the first image collection mode, the electronic device may switch from the first image collection mode to the second image collection mode based on any second operation that may be detected, for example, a switch from the AR mode to the normal collection mode, to satisfy a user's basic image capturing need.

In one embodiment of the control method of the electronic device of the present disclosure, after the electronic device acquires the second operation, the electronic device may further acquire second operation information corresponding to the second operation. At this point, switching the electronic device from the first image collection mode to the second image collection mode based on the second operation may include: switching the electronic device from the first image collection mode to the second image collection mode based on the second operation information. Further, the first operation information and the second operation information may both include at least a pressure value, and the pressure value corresponding to the second operation may be lower than the pressure value corresponding to the target operation.

For example, in one embodiment, after the electronic device detects the second operation, the electronic device may acquire the second operation information corresponding to the second operation, and trigger the electronic device to switch from the first image collection mode to the second image collection mode based on the second operation information. When both the first operation information and the second operation information include at least a pressure value, the pressure value corresponding to the second operation may be lower than the pressure value corresponding to the target operation. For example, the electronic device may enter the AR mode based on a hard-press operation, and switch from the AR mode to the normal mode based on a soft-press operation. Therefore, the control method of the electronic device in the embodiments of the present disclosure is easy to use and simple to operate, provides multiple functions without introducing extra complex operations to the user, and may lay a foundation for improving the user experience.

Based on the embodiments of the control method of the electronic device of the present disclosure, it may be possible to determine whether to trigger the electronic device to enter the first image collection mode based on the target operation for the target image in the viewfinder interface and the relationship between the first operation information of the target operation and the predetermined rule. In the first image collection mode, the electronic device may acquire the predetermined multimedia information, at least combine the target image with the predetermined multimedia information, and display the combined multimedia information including the target image the viewfinder interface to realize the AR effect. Therefore, based on the control method of the electronic device provided in the embodiments of the present disclosure, it may be possible to achieve the purpose of quickly entering the AR mode based on the user operation in the regular image capturing process. In addition, the method of quickly entering the AR mode may be performed automatically by the electronic device based on the user operation without intervention by the user. Therefore, compared with complicated manual methods of entering the AR mode, the control method of the present disclosure is simple and more user friendly, and may provide a foundation for further improving user experience.

Figure 2:
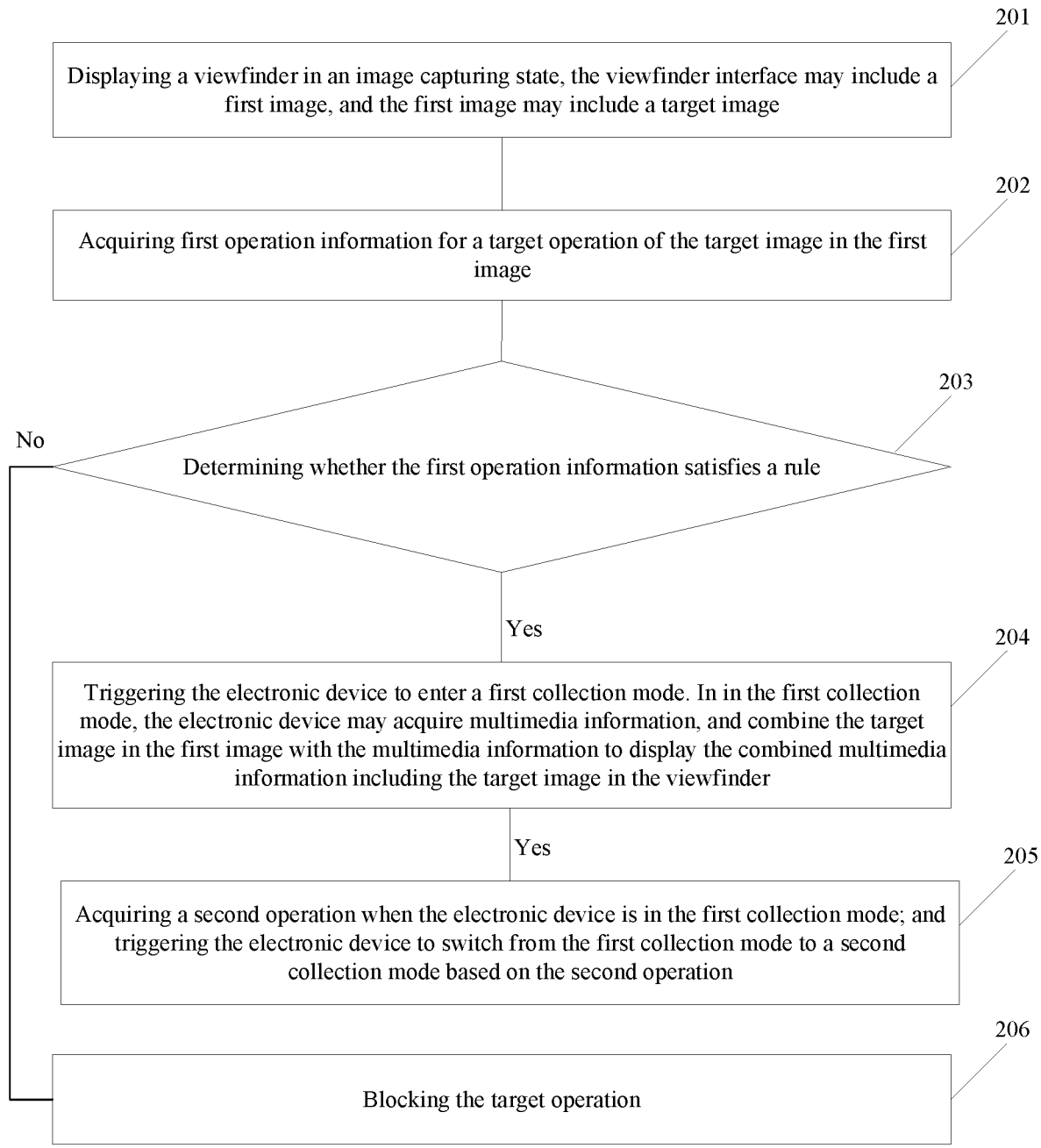
FIG. 2 is a flowchart of a control method of an electronic device according to another embodiment of the present disclosure.

FIG. 2 is a flowchart of a control method of an electronic device according to another embodiment of the present disclosure.

The control method provided in the embodiments of the present disclosure may be applied to an electronic device. The electronic device may specifically be a camera or the like; or a mobile phone, a tablet, or similar devices capable of supporting an image capturing function. Further, the control method provided in the embodiments of the present disclosure may allow the electronic device to quickly enter the AR mode based on a user operation during a regular image capturing process. In addition, the process of entering the AR mode may be performed automatically by the electronic device without intervention by the user. Therefore, compared with the complicated manual methods to enter the AR mode, the control method of the present disclosure is simple and more user friendly, and may provide a foundation for further improving user experience.

More specifically, as shown in FIG. 2, a control method of an electronic according to another embodiment of the present disclosure may include the following steps.

Step 201, displaying a viewfinder interface in an image capturing mode, and the viewfinder interface may include a first image, including a target image.

More specifically, the electronic device may enter an image capturing mode and display a viewfinder interface. The viewfinder interface may include a first image including the target image collected by the electronic device.

Step 202, acquiring first operation information for a target operation of the target image in the first image.

More specifically, for example, the target operation of the target image in the first image of the viewfinder interface may be detected by a sensor. When the target operation is detected, the first operation information of the target operation may be obtained.

To reduce the probability of an erroneous operation, the target operation may specifically be an operation for the target image. For example, an operation that meets certain conditions among various user operations may be set as the target operation. That is, the various user operations may be screened by certain conditions, thereby reducing the probability of an erroneous operation.

More specifically, in one embodiment, a first operation of the electronic device may be acquired and location information corresponding to the first operation may be acquired. When the location information corresponding to the first operation is within a target area in which the target image may be located in the first image, the first operation may be determined as the target operation.

The first operation may be any operation of the user, such as any type of user operation in a task region of the viewfinder interface.

Step 203, determining whether the first operation information satisfies a rule or a predetermined rule; when the rule is satisfied, Step 204 may be performed; otherwise, Step 206 may be performed.

Step 204, triggering the electronic device to enter a first image collection mode. In the first image collection mode, the electronic device may acquire multimedia information, and at least combine the target image in the first image with the multimedia information to display the augmented multimedia information with the target image in the viewfinder interface.

More specifically, when the electronic device determines that the first operation information satisfies the rule, the electronic device may be triggered to enter the first image collection mode. In the first image collection mode, the electronic device may acquire multimedia information, such as AR information, and at least combine the target image in the first image with the predetermined multimedia information. As such, the combined multimedia information including the target image may be displayed in the viewfinder interface. That is, when the electronic device is in the first image collection mode, the electronic device may combine the AR information automatically with the currently acquired target image, and display the combined multimedia information including the target image to realize the AR effect. Of course, in one embodiment, the electronic device may combine other acquired contents other than the target image in the first image with the predetermined AR information based on an actual setting to realize the AR effect.

Step 205, acquiring a second operation indicating a switch of the collection mode and triggering the electronic device to switch from the first image collection mode to a second image collection mode based on the second operation when the electronic device is in the first image collection mode. The first image may be included in the viewfinder interface in the second image collection mode.

In one embodiment, the electronic device may further correspond to a second image collection mode. That is, when the electronic device is in the first image collection mode, the electronic device may switch from the first image collection mode to the second image collection mode based on any second operation that may be detected, such as switching from the AR mode to the regular image capturing mode, to satisfy a user's image capturing need.

In one embodiment of the control method of the electronic device of the present disclosure, after the electronic device receives the second operation, the electronic device may further acquire second operation information corresponding to the second operation. At this point, switching the electronic device from the first image collection mode to the second image collection mode based on the second operation may include: switching the electronic device from the first image collection mode to the second image collection mode based on the second operation information. Further, the first operation information and the second operation information may both include at least a pressure value, and the pressure value corresponding to the second operation may be lower than the pressure value corresponding to the target operation.

For example, the electronic device may enter the AR mode based on a hard-press operation, and switch from the AR mode to the normal mode based on a soft-press operation. Therefore, the control method of the electronic device provided in the embodiments of the present disclosure is easy to use and simple to operate, provides multiple functions without introducing complex user operations, and may lay a foundation for further improving user experience.

Step 206, blocking the target operation.

In one embodiment, the first operation information may include at least a pressure value. Similarly, determining whether the first operation information satisfies the rule may include: determining whether a pressure value corresponding to the target operation is greater than a pressure threshold. More specifically, when the pressure value corresponding to the target operation is greater than the pressure threshold, the electronic device may be triggered to enter the first image collection mode; or, when the pressure value corresponding to the target operation is less than or equal to the pressure threshold, the electronic device may be triggered to enter the second image collection mode. The second collection may be different from the first image collection mode. The second image collection mode may be a regular collection mode. For example, in the second image collection mode, the electronic device may only display the collected first image including the target image in the viewfinder interface, and may not combine the collected first image with the AR information.

Further, when the second image collection mode is specifically a regular image collection mode, controlling the electronic device to enter the second image collection mode may specifically include: maintaining the electronic device in the second image collection mode. That is, before the electronic device receives the target operation, the electronic device may display the viewfinder interface based on the second image collection mode.

In one embodiment, when it is determined that the pressure value corresponding to the target operation is greater than the pressure threshold, for example, when the target operation is a hard-press operation, the electronic device may enter the first image collection mode, for example, entering the AR mode and displaying the AR effect. Otherwise, when it is determined that the pressure value corresponding to the target operation is less than or equal to the pressure threshold, for example, when the target operation is a soft-press operation, the electronic device may maintain its existing state, for example, maintaining the second image collection mode and does not display the AR effect.

The control method of the electronic device according to the embodiments of the present disclosure is further described in detail below in conjunction with a specific application scenario. More specifically, for example, when a camera has a viewfinder, the user may perform a hard-press operation (i.e., the pressure value of the trigger operation may be greater than the pressure threshold) on the image of an object displayed in the camera. At this point, the camera may enter the AR mode and the augmented reality effect may be realized by the AR mode, such as the recognition of streets or buildings, or other corresponding effects. Further, when the camera is in the AR mode and a soft-press operation (i.e., the pressure value of the trigger operation may be less than the pressure threshold) is received, the camera may exit the AR mode and enter the normal collection mode.

The control method of the electronic device provided in the embodiment of the present disclosure may control the electronic device to enter the AR mode based on a hard-press operation, which is easy to use, the AR effect may be called up quickly. In addition, since the entry into the AR mode may be implemented based on the user's hard-press operation, an undesirably AR effect may be prevented from occurring, and the user's regular image capturing activities may not be disturbed. Further, since there may be many gestures to control the electronic device (such as a camera), adding the hard-press operation may not cause conflicts with the existing gestures. Therefore, the control method of the electronic device provided in the embodiment of the present disclosure has higher operability. In addition, since the AR mode may be a less used scenario, the hard-press operation may further prevent the user from an erroneous operation.

Based on the embodiments of the control method of the electronic device of the present disclosure, it may be possible to determine whether to trigger the electronic device to enter the first image collection mode based on the target operation for the target image in the viewfinder interface and the relationship between the first operation information of the target operation and the predetermined rule. In the first image collection mode, the electronic device may acquire the predetermined multimedia information, at least combine the target image with the predetermined multimedia information, and display the combined multimedia information including the target image the viewfinder interface to realize the AR effect. Therefore, based on the control method of the electronic device provided in the embodiments of the present disclosure, it may be possible to achieve the purpose of quickly entering the AR mode based on the user operation in the regular image capturing process. In addition, the method of quickly entering the AR mode may be performed automatically by the electronic device based on the user operation without additional intervention by the user. Therefore, compared with the complicated manual methods of entering the AR mode, the control method of the present disclosure is simple and more user friendly, and may provide a foundation for further improving user experience.

Figure 3:
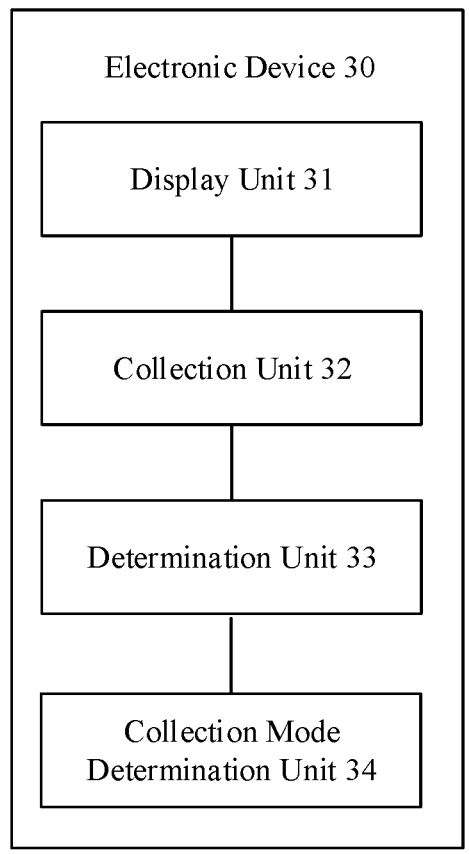
FIG. 3 is a block diagram of an electronic device according to an embodiment of the present disclosure.

FIG. 3 is a block diagram of an electronic device according to an embodiment of the present disclosure.

An embodiment of the present disclosure provides an electronic device. As shown in FIG. 3, an electronic device 30 may include a display unit 31, a collection unit 32, a determination unit 33, and a collection mode determination unit 34. Further, the electronic device control method provided in the embodiments of the present disclosure may be implemented in the electronic device 30.

The display unit 31 may be used to display a viewfinder interface in an image capturing mode, and the viewfinder interface may include a first image including a target image.

The collection unit 32 may be used to collect first operation information for a target operation of the target image in the first image.

The determination unit 33 may be used to determine whether the first operation information satisfies a predetermined rule.

The collection mode determination unit 34 may be used to determine whether to trigger the electronic device to enter a first image collection mode based on a determination result. In in the first image collection mode, at least the target image in the first image may be combined with predetermined multimedia information to display the combined multimedia information including the target image in the viewfinder interface.

In one embodiment, the first operation information may include at least a pressure value. Correspondingly, the determination unit 33 may further be used to determine whether the pressure value may be greater than a pressure threshold.

In one embodiment, the collection mode determination unit 34 may further be used to trigger the electronic device to enter the first image collection mode when a pressure value corresponding to the target operation may be greater than the pressure threshold; or, trigger the electronic device to enter a second image collection mode when the pressure value corresponding to the target operation may be less than or equal to the pressure threshold, where the second image collection mode may be different from the first image collection mode.

In one embodiment, the collection unit 32 may further be used to collect a second operation indicating a switch of the collection mode when the electronic device is in the first image collection mode. The collection mode determination unit 34 may further be used to trigger the electronic device to switch from the first image collection mode to the second image collection mode based on the second operation. In the second image collection mode, the electronic device may display the collected first image including the target image in the viewfinder interface.

In one embodiment, the collection unit 32 may further be used to collect second operation information corresponding to the second operation.

In some embodiments, the determination unit 33 may further be used to trigger the electronic device to switch from the first image collection mode to the second image collection mode based on the second operation information. The first operation information and the second operation information both include at least a pressure value, and a pressure value corresponding to the second operation is different from (e.g., lower than) a pressure value corresponding to the target operation.

In one embodiment, the collection unit 32 may further be used to collect the first operation of the electronic device, collect location information corresponding to the first operation, and determine the first operation is the target operation when the location information corresponding to the first operation is within a target area in which the target image may be located in the first image.

It may be understood that the display unit 31, the collection unit 32, the determination unit 33, and the collection mode determination unit 34 may be implemented in one unit or module. Any one of the units or modules may be split into a plurality of units or modules. Alternatively, at least some of the functionality of one or more of the units or modules may be combined with at least some of the functionality of the other units or modules and implemented in one unit or module. In one embodiment, one or more of the display unit 31, the collection unit 32, the determination unit 33, and the collection mode determination unit 34 may be implemented at least partially in a hardware circuit, such as a Field Programmable Gate Array (FPGA), a Programmable Logic Array (PLA), a system on chip, a system on substrate, a system on package, an Application Specific Integrated Circuit (ASIC), or in hardware or firmware in any other reasonable manner that may integrate or package the circuit, or in a suitable combination of software, hardware, and firmware. Alternatively, one or more of the display unit 31, the collection unit 32, the determination unit 33, and the collection mode determination unit 34 may be implemented at least partially as a computer programmable module or unit. When the computer program is executed by the computer, the functions of the corresponding modules or units may be implemented.

It should be noted that the description of the embodiments of electronic device mentioned above is similar to the control method mentioned above and has the same beneficial effects as the embodiments of the control method, and therefore, will not be repeated herein. For technical details that are not disclosed in the embodiments of the present disclosure, those skilled in the art may refer to the description of the embodiments of the control method of the present disclosure. For the sake of brevity, no further details are repeated herein.

Figure 4:
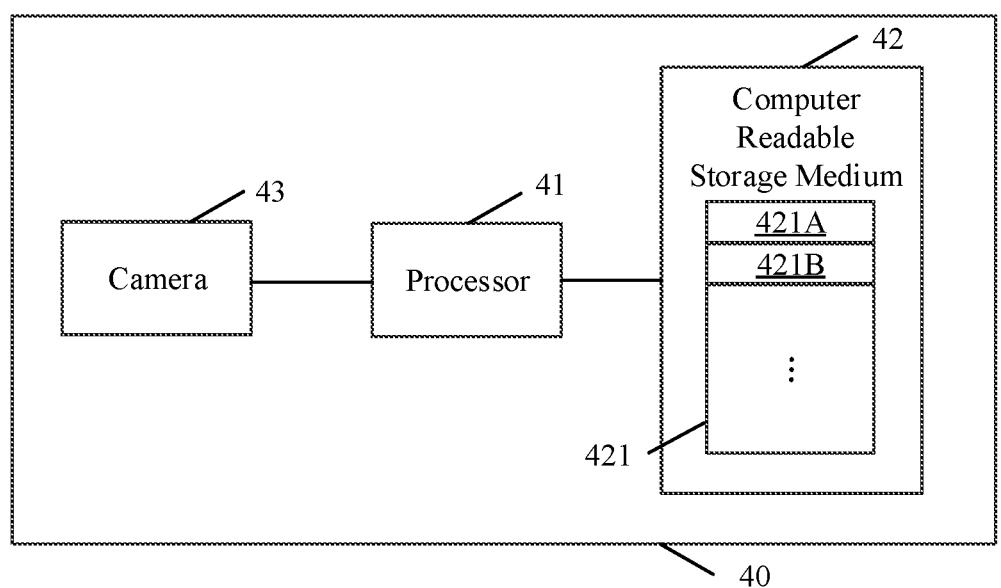
FIG. 4 is a block diagram of an electronic device according to another embodiment of the present disclosure.

FIG. 4 is a block diagram of an electronic device according to another embodiment of the present disclosure.

As shown in FIG. 4, an electronic device 40 may include a processor 41 and a computer readable storage medium 42. The electronic device for configuring a server cluster may perform the control method described above with reference to FIGS. 1 and 2 to implement a control method of an electronic device provided in the embodiments of the present disclosure.

More specifically, the processor 41 may include, for example, a general purpose microprocessor, an instruction set processor and/or a related chipset and/or a special purpose microprocessor (e.g., an ASIC), and the like. The processor 41 may further include an onboard memory for caching purposes. Furthermore, the processor 41 may be a single processing unit or a plurality of processing units for performing different actions of the control method workflow according to the embodiments of the present disclosure described with reference to FIGS. 1 and 2.

The computer readable storage medium 42 may be, for example, any medium that may contain, store, communicate, propagate, or transport instructions. For example, the readable storage medium may include, but is not limited to, an electronic, magnetic, optical, electromagnetic, infrared, or semiconductor system, apparatus, device, or propagation medium. Specific examples of the readable storage medium may include: a magnetic storage device such as a magnetic tape or a hard disk (HDD); an optical storage device such as a compact disk (CD-ROM); a memory such as a Random Access Memory (RAM) or a flash memory; and/or a wired/wireless communication link.

The computer readable storage medium 42 may store a computer program 421. The computer program 421 may include computer executable instructions that, when executed by the processor 41, may cause the processor 41 to perform, for example, the control method workflow and any variations thereof in accordance with the embodiments of the present disclosure described above in conjunction with FIGS. 1 and 2.

The computer program 421 may include, for example, computer executable instructions including a computer program module. For example, in one embodiment, the instructions in the computer program 421 may include one or more program modules, such as module 421A, module 421B . . . . It should be noted that the division manner and the number of modules are not fixed, and those skilled in the art may use suitable program modules or program module combinations according to actual situations. When these program module combinations are executed by the processor 41, the processor 41 may perform, for example, the functions of the control method workflow and any variations thereof in accordance with the embodiments of the present disclosure described above in connection with FIGS. 1 and 2.

In one embodiment, the electronic device 40 may further include a camera 43. The camera 42 may be used to collection images. The processor 41 may interact with the camera 43 to perform the control method workflow and any variations thereof in accordance with the embodiments of the present disclosure described above in connection with FIGS. 1 and 2.

In one embodiment, one or more of the display unit 31, the collection unit 32, the determination unit 33, and the collection mode determination unit 34 may be implemented as a computer program module described in connection to FIG. 4, which, when executed by the processor 41, may implement the corresponding operations described above.

The embodiment of the present application further provides a readable storage medium for storing computer executable instructions. When the computer executable instructions are executed by the processor, the processes included in any of the display methods described above may be implemented.

Finally, it is noted that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants mean non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

Based on embodiments of the present disclosure, the aforementioned method, device, unit and/or module may be implemented by using an electronic device having the computing capacity to execute software that comprises computer instructions. Such system may include a storage device for implementing various storage manners mentioned in the foregoing descriptions. The electronic device having the computing capability may include a device capable of executing computer instructions, such as a general-purpose processor, a digital signal processor, a specialized processor, a reconfigurable processor, etc., and the present disclosure is not limited thereto. Execution of such instructions may allow the electronic device to be configured to execute the aforementioned operations of the present disclosure. The above-described device and/or module may be realized in one electronic device, or may be implemented in different electronic devices. Such software may be stored in a computer readable storage medium. The computer storage medium may store one or more programs (software modules), the one or more programs may comprise instructions, and when the one or more processors in the electronic device execute the instructions, the instructions enable the electronic device to execute the disclosed method.

Such software may be stored in forms of volatile memory or non-volatile memory (e.g., storage device similar as ROM), no matter whether it is erasable or overridable, or may be stored in the form of memory (e.g., RAM, memory chip, device or integrated circuit), or may be stored in optical readable media or magnetic readable media (e.g., CD, DVD, magnetic disc, or magnetic tape, etc.). It should be noted that, the storage device and storage media are applicable to machine-readable storage device embodiments storing one or more programs, and the one or more programs comprise instructions. When such instructions are executed, embodiments of the present disclosure are realized. Further, the disclosed embodiments provide programs and machine-readable storage devices storing the programs, and the programs include codes configured to realize the device or method described in any of the disclosed claims. Further, such programs may be electrically delivered via any medium (e.g., communication signal carried by wired connection or wireless connection), and various embodiments may appropriately include such programs.

In some embodiments provided by the disclosure, it should be understood that the disclosed device and method may be implemented in another manner. The embodiments described above is only exemplary, division of the units are only logic function divisions, and other division manners may be adopted in different implementations. For example, multiple units or components may be combined or integrated into another system, or some characteristics may be neglected or not executed. In addition, coupling or direct coupling or communication connection between each displayed or discussed component may be indirect coupling or communication connection implemented through some interfaces, equipment or units, and may also be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve a purpose of the solutions of the embodiment according to a practical requirement.

In addition, each function unit in each embodiment of the disclosure may be integrated into a processing unit, each unit may also exist independently, and two or more than two units may also be integrated into a unit. The integrated unit may be implemented in a hardware form, and may also be implemented in form of combining hardware and a software function unit.

Those skilled in the art should know that: all or part of the steps of the method embodiment may be implemented by related hardware instructed through a program, the program may be stored in a computer-readable storage medium, and the program is executed to execute the steps of the method embodiment; and the storage medium includes: various media capable of storing program codes, such as mobile storage equipment, a Read-Only Memory (ROM), a magnetic disk or a compact disc.

Alternatively, when the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product may be stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily derived by a person skilled in the art within the technical scope disclosed in the present disclosure shall fall within the protection scope of the present disclosure. Therefore, the protection scope of the present disclosure shall be subject to the protection scope of the claims.

The specific embodiments described above are not intended to limit the scope of the present disclosure. Any corresponding change and variation performed according to the technical idea of the present disclosure shall fall within the protection scope of the claims of the present disclosure.

What is claimed is:

1. A control method of an electronic device, comprising:
displaying a viewfinder interface, the viewfinder interface including a first image, the first image including a target image, and the target image being located in a target area in the first image;
receiving a first operation of the target image in the first image;
acquiring location information corresponding to the first operation;
in response to the location information corresponding to the first operation being not in the target area:
blocking the first operation; and
in response to the location information corresponding to the first operation being in the target area:
identifying the first operation as a target operation;
triggering the electronic device to enter a first image collection mode in response to a pressure value corresponding to the target operation being greater than a pressure threshold, wherein in the first image collection mode, the target image in the first image is combined with multimedia information to display a combined multimedia information with the target image in the viewfinder interface; and in a situation that the electronic device is in the first image collection mode:
- acquiring a second operation indicating a switch of image collection mode; and
- triggering the electronic device to switch from the first image collection mode to a second image collection mode based on the second operation;

wherein:
- in the second image collection mode, the first image is included in the viewfinder interface;
- the second image collection mode is different from the first image collection mode; and
- a pressure value corresponding to the second operation is different from the pressure value corresponding to the target operation.

2. The method of claim 1, further comprising:
determining whether the pressure value corresponding to the target operation is greater than the pressure threshold.

3. The method of claim 2, further comprising:
triggering the electronic device to enter the second image collection mode in response to the pressure value corresponding to the target operation being less than or equal to the pressure threshold.

4. The method of claim 1, wherein the target operation includes a hard-press operation or a soft-press operation.

5. The method of claim 1, wherein the pressure value corresponding to the second operation is lower than the pressure value corresponding to the target operation.

6. An electronic device, comprising:
a display unit for displaying a viewfinder interface, the viewfinder interface including a first image, the first image including a target image, and the target image being located in a target area in the first image;
a collection unit for:
- receiving a first operation of the target image in the first image;
- acquiring location information corresponding to the first operation;
- blocking the first operation in response to the location information corresponding to the first operation being not in the target area; and
- identifying the first operation as a target operation in response to the location information corresponding to the first operation being in the target area and
a collection mode determination unit for triggering the electronic device to enter a first image collection mode in response to a pressure value corresponding to the target operation being greater than a pressure threshold,
wherein in the first image collection mode, the target image in the first image is combined with multimedia information to display a combined multimedia information with the target image in the viewfinder interface;
wherein in a situation that the electronic device is in the first image collection mode:
the collection unit receives a second operation indicating a switch of image collection mode; and
the collection mode determination unit triggers the electronic device to switch from the first image collection mode to a second image collection mode based on the second operation;
wherein:
in the second image collection mode, the first image is included in the viewfinder interface;
the second image collection mode is different from the first image collection mode; and
a pressure value corresponding to the second operation is different from the pressure value corresponding to the target operation.

7. The electronic device of claim 6, wherein the determination unit further determines whether the pressure value corresponding to the target operation is greater than the pressure threshold.

8. The electronic device of claim 7, wherein the collection mode determination unit triggers the electronic device to enter the second image collection mode in response to the pressure value corresponding to the target operation being less than or equal to the pressure threshold.

9. An electronic device comprising:
a camera for collecting images; and,
one or more processors configured to execute computer executable instructions to:
display a viewfinder interface, the viewfinder interface including a first image, the first image including a target image, and the target image being located in a target area in the first image;
receive a first operation of the target image in the first image;
acquire location information corresponding to the first operation;
in response to the location information corresponding to the first operation being not in the target area:
block the first operation;
in response to the location information corresponding to the first operation being in the target area:
identify the first operation as a target operation of the target image in the first image;
trigger the electronic device to enter a first image collection mode in response to a pressure value corresponding to the target operation being greater than a pressure threshold,
wherein in the first image collection mode, the target image in the first image is combined with multimedia information to display a combined multimedia information with the target image in the viewfinder interface; and
in a situation that the electronic device is in the first image collection mode:
acquire a second operation indicating a switch of image collection mode; and
trigger the electronic device to switch from the first image collection mode to a second image collection mode based on the second operation;
wherein:
in the second image collection mode, the first image is included in the viewfinder interface;
the second image collection mode is different from the first image collection mode; and
a pressure value corresponding to the second operation is different from the pressure value corresponding to the target operation.

10. The electronic device of claim 9, wherein the one or more processors are further configured to execute computer executable instructions to determine whether the pressure value corresponding to the target operation is greater than the pressure threshold.

11. The electronic device of claim 10, wherein the one or more processors are further configured to execute computer executable instructions to:
trigger the electronic device to enter the second image collection mode in response to the pressure value corresponding to the target operation being less than or equal to the pressure threshold.

\* \* \* \* \*